July 28, 1970     I. R. KOROTKIN     3,521,720
ARTICULATED VEHICLE WITH HYDRAULIC DRIVE, STEERING, AND
IMPLEMENT MANIPULATING SYSTEM Filed Feb. 28, 1969     2 Sheets-Sheet 1

INVENTOR
ISADORE R. KOROTKIN
BY Henderson & Strom
ATTORNEYS

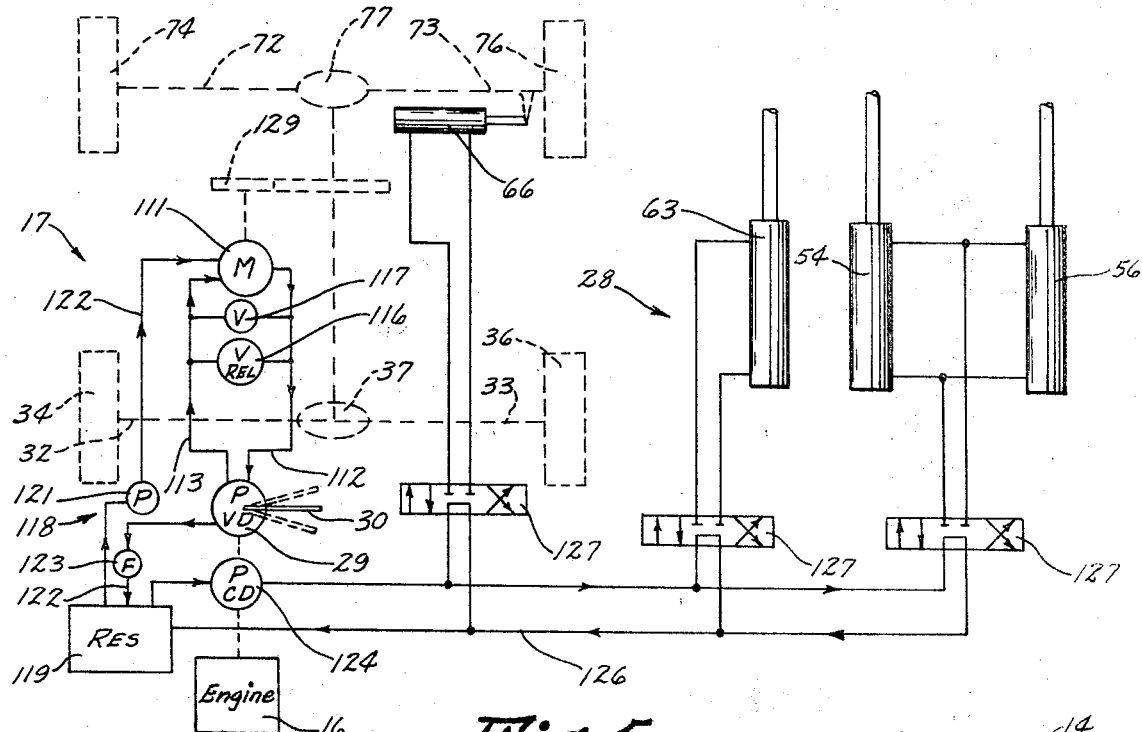
Fig. 5
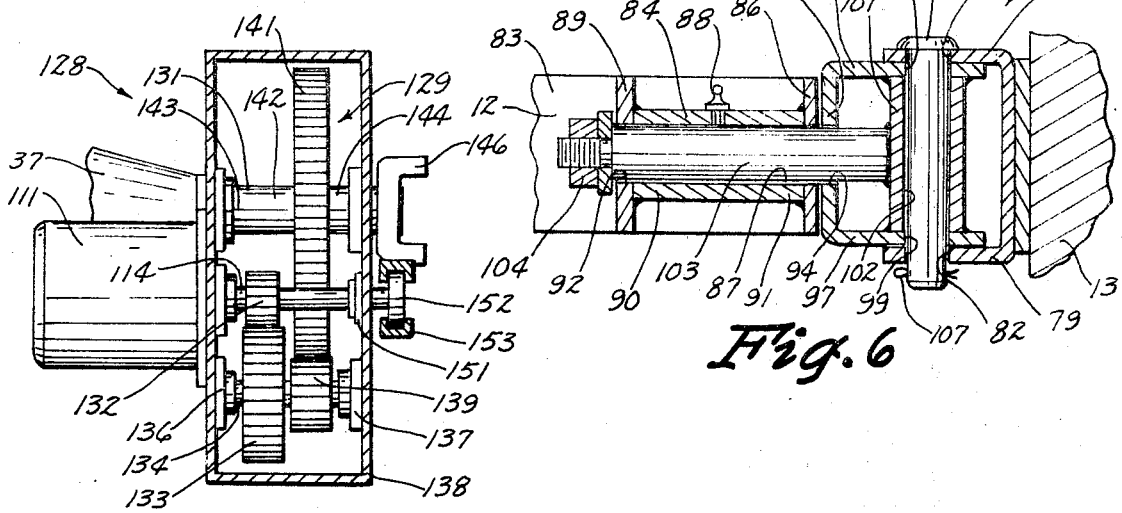
Fig. 6
Fig. 7
INVENTOR
ISADORE R. KOROTKIN
BY
Henderson & Shaw
ATTORNEYS

United States Patent Office 3,521,720
Patented July 28, 1970

1

3,521,720
ARTICULATED VEHICLE WITH HYDRAULIC DRIVE, STEERING, AND IMPLEMENT MANIPULATING SYSTEM
Isadore R. Korotkin, Pratt, Kans.
(30 Wedgewood Ave., Haifa, Israel)
Filed Feb. 28, 1969, Ser. No. 803,292
Int. Cl. B60k 17/00; B62d 9/00
U.S. Cl. 180—51                           7 Claims

ABSTRACT OF THE DISCLOSURE

This invention relates to an articulated vehicle comprising a work module and a power module having an engine mounted thereon. The engine supplies power to a closed loop hydraulic drive system, also mounted on the power module, and comprises a variable displacement hydraulic pump, a hydraulic motor, inlet and outlet conduits fluidly connecting the pump and the motor, and transmitting means for connecting the hydraulic motor to the ground engaging means of the power module. A novel universal joint connects the power module to the work module.

BACKGROUND OF THE INVENTION

This invention relates to an articulated vehicle of novel construction which utilizes a closed loop hydraulic drive system and a novel universal joint.

The articulated vehicle of this invention is designed to overcome these problems by utilizing a closed loop hydraulic drive system and a novel and simple universal joint.

SUMMARY OF THE INVENTION

This invention relates to an articulated vehicle comprising a power module carried by ground engaging means and having an engine mounted thereon, a work module carried by ground engaging means and having work means mounted thereon, and connecting means for connecting the power module and the work module which allows the work module to move, relative to the power module, about a verticle axis. A hydraulic pump, drivably connected to the engine and having a variable displacement, is mounted on the power module and is provided with control means for varying the displacement of the hydraulic pump. A hydraulic motor is also mounted on the power module and is fluidly connected to the hydraulic pump in a closed loop hydraulic circuit by inlet and outlet conduits. At least one relief valve is fluidly connected between the inlet conduits and the outlet conduits and replenishing means are provided to replenish the hydraulic fluid in the closed loop hydraulic circuit. Transmitting means drivingly connects the hydraulic motor to the ground engaging means of the power module.

An object of this invention is to provide an improved articulated vehicle of novel design.

Another object is to provide an articulated vehicle which does not require shifting.

A further object is to provide an articulated vehicle with a simplified drive train which utilizes a closed loop hydraulic circuit.

Another object is to provide an articulated vehicle which can be powered by either two wheel drive or four wheel drive.

A still further object is to provide an articulated vehicle which utilizes a variable displacement hydraulic pump in the drive means thereby eliminating the shifting of gears and eliminating the need for conventional brakes and clutches.

Another object of this invention is to provide an articulated vehicle wherein the engine can work at its most efficient speed at all times.

Still another object of this invention is to provide an articulated vehicle utilizing a universal joint of novel construction.

BRIEF DESCRIPTION OF THE DRAWINGS

FIG. 5 is a schematic of the hydraulic systems for the articulated vehicle;

FIG. 6 is a cross-sectional view of the connecting means for the articulated vehicle taken along line 6—6 of FIG. 3;

FIG. 7 is a cross-sectional view of the gear reduction assembly taken along line 7—7 of FIG. 3.

DESCRIPTION OF THE PREFERRED EMBODIMENT

Figure 1:
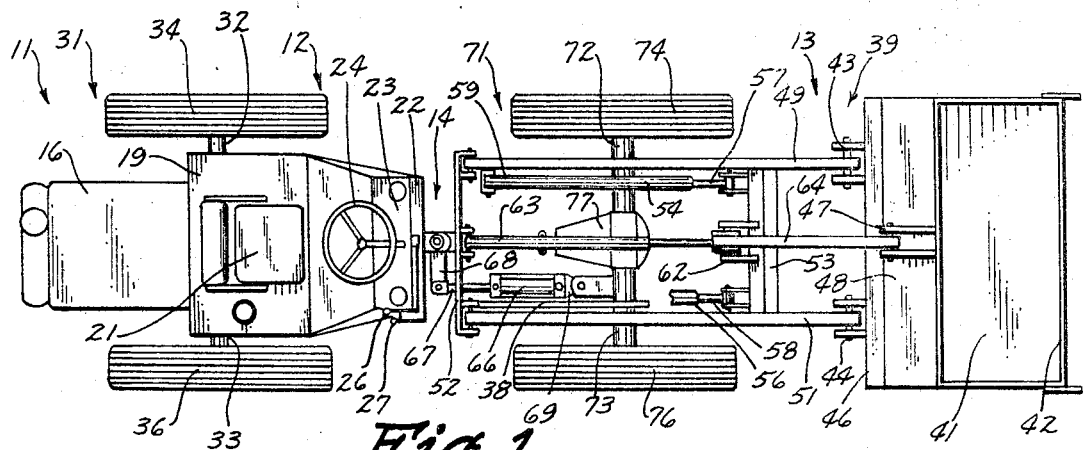
FIG. 1 is a top view of the articulated vehicle of this invention with one of the lifting cylinders partially cut away.
Figure 2:
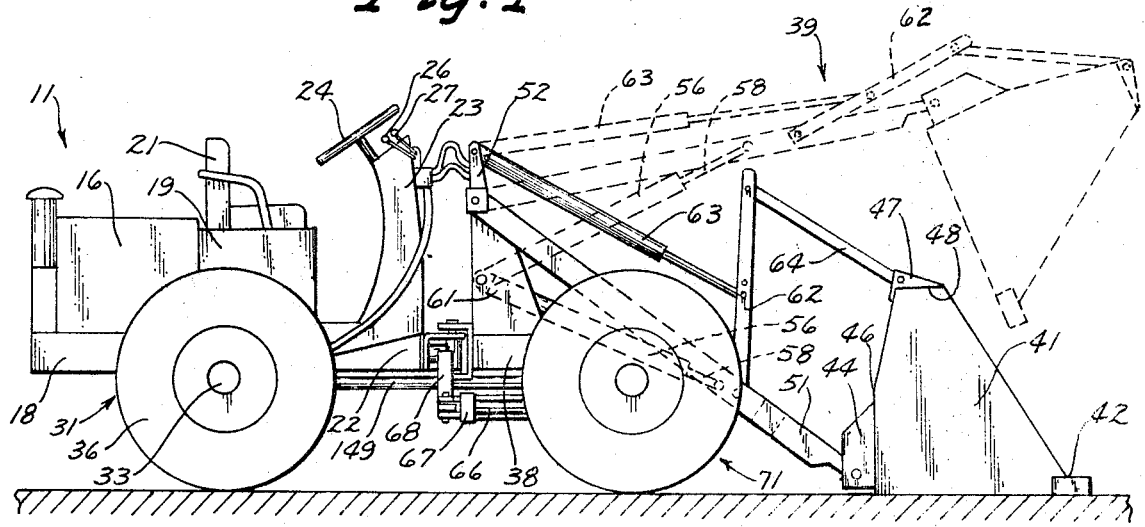
FIG. 2 is a side view of the articulated vehicle showing the scoop member in a lowered position, and, in phantom, in a raised position.

Referring now to the drawings, the articulated vehicle of this invention is generally indicated at 11 in FIGS. 1 and 2. The articulated vehicle 11 is comprised of a power module 12, a work module 13, and connecting means 14 for connecting the power module 12 to the work module 13. An engine 16 is mounted on the power module 12 and drives a closed loop hydraulic system 17 (FIG. 5) which is also mounted on the power module 12.

More specifically, the power module 12 (FIGS. 1 and 2) comprises a frame member 18 having an engine 16 mounted thereon. Preferably, the engine 16 is a conventional, gasoline internal combustion engine although diesel engines, turbines and electric motors can be utilized herein. The closed loop hydraulic system 17 (FIG. 5) is carried on the power module 12 and is, at least partially, enclosed by hood element 19. An operator's chair 21 is mounted on the hood element 19.

It is important to note that the operator's chair 21 is mounted on the hood element 19, which is an integral part of the power module 12. By placing the operator's chair 21 in this position, the chair 21 does not interfere with turning of the articulated vehicle 11. Additionally, an enclosed cab (not shown) can readily be provided if the chair 21 is mounted on the power module 12.

On the front portion 22 (FIGS. 1 and 2) of the power module 12 is rigidly attached an upstanding instrument board 23 on which is mounted a steering wheel 24, and two control levers 26 and 27 which are utilized to operate an open loop hydraulic system 28 (FIG. 5) explained in detail hereinafter, for the work module 13. A foot pedal, not shown, is operatively connected to a hydraulic pump 29 through arm 30 (FIG. 5) and is utilized to regulate the displacement of the hydraulic pump 29 as more particularly described hereinafter.

Figures 3, 4:
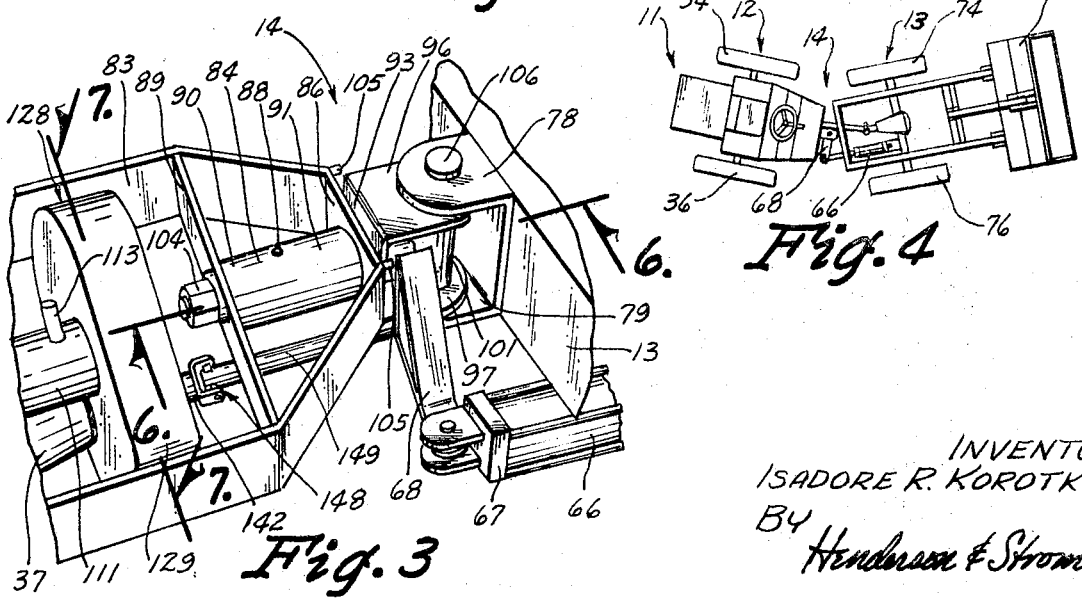
FIG. 3 is an enlarged perspective view of the connecting means and the gear reduction assembly of the articulated vehicle.
FIG. 4 is a reduced top view of the articulated vehicle in a turning position wherein portions of the work module have been cut away.

The power module 12 is mounted on ground engaging means 31 (FIGS. 1 and 2) which is comprised of a left axle 32 and a right axle 33 having a left wheel 34 and a right wheel 36 connected, respectively, to the axles 32 and 33. The axles 32 and 33 are operatively and drivingly connected to a differential 37 (FIGS. 3, 5 and 7). The differential 37 can be of a standard automotive type.

The work module 13 comprises a frame member 38 having work means 39 mounted thereon. The work means can comprise a posthole digger, a bulldozer blade, a snow plow or the like. As shown in FIGS. 1 and 2, however, the work means 39 is a front loading scoop consisting of a bucket 41, open at the front 42 thereof and having two bifurcated arm attaching members 43 and 44 mounted on the back 46 of the bucket 41 and a third bifurcated arm attaching member 47 mounted on the top 48 of the bucket 41. Two arms 49 and 51 are, respectively, rotatably affixed at one end to one of the arm attaching members 43 and 44 of the bucket 41 and, at the other end, rotably affixed to an upstanding mounting panel 52 extending upwardly of the frame member 38. The arms 49 and 51 are joined together by lateral member 53 intermediate the ends of the arms 49 and 51. Hydraulic lifting cylinders 54 and 56 are rotatably attached, respectively, at one end 57 and 58 to the lateral member 53. The other ends 59 and 61 of the lifting cylinders 54 and 56 are rotatably affixed to the mounting panel 52. The hydraulic lifting cylinders 54 and 56 are activated by the open loop hydraulic circuit 28 (FIG. 5).

Rotatably affixed to the lateral member 53 and extending upwardly thereof is a first bucket control leg 62 (FIGS. 1 and 2). A hydraulic bucket control cylinder 63 is rotatably attached at one end to the mounting panel 52 and at the other end to the bucket control leg 62 intermediate the ends of the bucket control leg 62. The hydraulic cylinder 63 is operated by the open loop hydraulic circuit 28. A second bucket control leg 64 is rotatably attached at its ends between the uppermost end of the first bucket control leg 62 and the arm attaching member 47. As the hydraulic bucket control cylinder 63 is expanded outwardly, the bucket 41 moves forwardly and downwardly and as the cylinder 63 is contracted, the bucket 41 moves backwardly and upwardly.

Also attached to the frame member 38 is a hydraulic power steering cylinder 66 (FIGS. 1 and 2). The hydraulic power steering cylinder 66 is rotatably attached, at its rearward end 67, to a bracket 68 rigidly affixed to the connecting means 14 and, at its forward end 69 to the ground engaging means 71 on which the work module 13 is mounted. The power steering cylinder 66 effectively limits the turning radius of this articulated vehicle 11. The hydraulic power steering cylinder 66 is operated by the open loop hydraulic circuit 28.

The work module 13 is mounted on ground engaging means 71 (FIGS. 1 and 2) which is comprised of a left axle 72 and a right axle 73 having a left wheel 74 and a right wheel 76 connected, respectively, to the axles 72 and 73. The axles 72 and 73 are operatively, and if desired, drivingly connected to a differential 77 (FIGS. 1 and 5) which can be of a standard automotive type.

A connecting means 14 connects the power module 12 and the work module 13 and allows the work module 13 to move, relative to the power module 12, about a vertical axis. Preferably the work module 13 is so connected that it can move, relative to the power module 12, about a vertical axis and about a horizontal axis extending longitudinally of the articulated vehicle 11. By utilizing this connecting means 14, all four wheels 34, 36, 74 and 76 remain on the ground at all times, even in extremely rough terrain.

The connecting means 14, as shown in FIGS. 3 and 6, comprises a first pair of ears 78 and 79 rigidly affixed to the work module 13. The ears 78 and 79 are horizontally disposed and vertically spaced apart. Holes 81 and 82 are formed through the ears 78 and 79 and are vertically aligned.

On the power module 12, a frame element 83 is rigidly affixed and extends outwardly thereof. A sleeve 84 is formed on the frame element 83 and is normally horizontally disposed and extends inwardly of the frame element 83. As shown in FIG. 6, the sleeve 84 is disposed perpendicularly of the outermost portion 86 of the frame element 83 and has a circular channel 87 formed longitudinally therethrough. A grease fitting 88 is preferably utilized on the sleeve 84 intermediate the ends thereof. A lateral strut 89 is juxtaposed of the innermost end 90 of the sleeve 84. The sleeve 84 is rigidly connected at its other end 91 to the outermost portion 86 of the frame element 83. A hole 92 is formed through the lateral strut 89 and is aligned with the channel 87 formed through the sleeve 84.

An upstanding member 93 is juxtaposed of the outermost portion 86 of the frame element 83 and has a hole 94 formed therethrough, aligned with the channel 87 formed through the sleeve 84. A second pair of ears 96 and 87 are rigidly affixed and extend outwardly of the ends of the upstanding member 93. The ears are normally horizontally disposed, vertically spaced apart, and mate with the first pair of ears 78 and 79. Holes 98 and 99 are formed through the ears 96 and 97 and are vertically aligned with each other and verticaly alignable with holes 81 and 82. A second sleeve 101 having a channel 102 formed therethrough and vertically aligned with holes 98 and 99 is attached at its ends to the second pair of ears 96 and 97.

A bolt means 103 is rigidly attached to the outer periphery of the second sleeve 101 and extends horizontally through and is rigidly fixed in the hole 94 in the upstanding member 93, as by welding, through the channel 87 of the sleeve 84 and through the hole 92 in the lateral strut 89. A nut 104 rotatably secures the upstanding member 93 to the frame element 83 and the lateral strut 89. The bolt means 103 extends just beyond the lateral strut 89 and has a shoulder formed thereon which prevents the nut 104 from being tightened too tightly and preventing the rotation of upstanding member 93 relative to frame element 83.

A series of stops 105 are welded onto the outermost portion 86 of the frame element 83. The stops 105 are positioned to limit rotation about the horizontal axis and prevent tipping of the vehicle 11.

A trunnion 106 rotatably affixes the power module 12 to the work module 13 and extends through the vertically aligned holes 81, 82, 98 and 99 of the first and second pairs of ears 78, 79, 96 and 97 and through the channel 102 of the second sleeve 101. The trunnion 106 is secured therein by a cotter key 107. By utilizing this connecting means 14, the work module 13 can move, relative to the power module 12, about a vertical axis, and about a horizontal axis extending longitudinally of the articulated vehicle 11.

The closed loop hydraulic system 17 (FIG. 5) utilized to drive this articulated vehicle 11 comprises a hydraulic pump 29 having a variable displacement, a control arm 30 connected to the hydraulic pump 29 for varying the displacement of the pump 29, and a hydraulic motor 111 (FIGS. 3, 5 and 7). The hydraulic pump 29 and the hydraulic motor 111 are fluidly connected by inlet conduits 112 and outlet conduits 113.

More specifically, the hydraulic pump 29 is affixed to the engine 16 and is operatively and drivably connected to the engine 16 as illustrated in FIG. 5. The hydraulic pump 29 has a variable and reversible displacement and is, preferably, a variable displacement piston pump 29. Another variable displacement swach plate pump suitable for use herein is described in McAlvay, U.S. Pat. 3,422,767. The control arm 30 is generally a lever as illustrated in FIG. 5 and is utilized to vary the displacement of the hydraulic pump 29 and to thereby vary the amount of hydraulic fluid entering and leaving the pump 29. By using this hydraulic pump 29, shifting of gears is eliminated; speed is directly proportional to the position of the control arm 30; and dynamic braking is controlled through the pump 29 and control arm 30.

The hydraulic motor 111 is also mounted on the power module 12 (FIG. 3) as explained in detail hereinafter. The hydraulic motor 111 has a rotatable shaft 114 (FIG. 7) driven by the hydraulic motor 111 and extending outwardly therefrom. The hydraulic motor 111 is operatively and drivingly connected to the ground engaging means 31 of the power module 12 and may be operatively and drivingly connected to the ground engaging means 71 of the work module 13 if four wheel drive is desired. These piston motors provide high torque at low speeds. Variable displacement pumps can also be used herein to provide two speeds; however, they are not preferred.

The hydraulic pump 29 and the hydraulic motor 111 are fluidly connected in a closed loop hydraulic circuit 17 by pump inlet conduits 112 and pump outlet conduits 113. It should be understood, however, that when the pump 29 is reversed the inlet conduit 112 will be functioning as the outlet conduit and the outlet conduit 113 will be functioning as the inlet conduit. These conduits 112 and 113 should be sufficiently strong to withstand hydraulic pressures in the range of 5000 p.s.i. generated by the hydraulic pump 29.

At least one relief valve 116 (FIG. 5) is fluidly connected between the inlet conduit 112 and the outlet conduit 113. The relief valve protects the closed loop hydraulic drive system 17 from overload and gives an inherent cushioned response to changes in the control arm 30.

A needle valve 117 (FIG. 5) is fluidly connected between the inlet conduit 112 and the outlet conduit 113. The needle valve 117 can be opened to equalize pressure in the closed loop hydraulic circuit 17 and thereby allow the vehicle 11 to free-wheel. Free-wheeling can also be accomplished by providing a clutch or slip gear (not shown).

Replenishing means 118 (FIG. 5) is fluidly connected to the closed loop hydraulic circuit 17 and is utilized to replenish the closed loop hydraulic circuit 17 with hydraulic fluid. The replenishing means 118 comprises a reservoir 119 for hydraulic fluid mounted on the power module 12, and an auxiliary pump 121, generally a positive displacement pump, mounted on the power module 12 and operatively and drivably connected to the engine 16. The reservoir 119, the pump 121, and the closed loop hydraulic circuit 17 are fluidly connected by replenishing conduits 122 having a filter 123 disposed therein. The auxiliary pump 121 is operated only when necessary to replenish the closed loop hydraulic circuit 17. Only enough fluid is added to the closed loop hydraulic circuit 17 to maintain its high efficiency.

The open loop hydraulic circuit 28 (FIG. 5) comprises a positive displacement pump 124 and four hydraulic cylinders, i.e., two lifting cylinders 54 and 56, the bucket control cylinder 63, and the power steering cylinder 66. The pump 124, the cylinders 54, 56, 63 and 66 and the reservoir 119 are all fluidly connected by conduits 126. Valves 127 are fluidly connected in conduits 126 leading to each of the hydraulic cylinders 54, 56, 63 and 66 and control the movement of hydraulic fluid into and out of the cylinders 54, 56, 63 and 66 and thereby control the movement of those cylinders.

Transmitting means 128 operatively and drivingly connects the shaft 114 of the hydraulic motor 111 to the ground engaging means 31 of the power module 12. The transmitting means 128 comprises a gear reduction assembly 129, differential means 37 drivably connected to the ground engaging means 31 of the power module 12, and drive means 131 drivably connecting the gear reduction assembly 129 to the differential means 37.

As shown in FIG. 7, a driving gear 132 is mounted on the shaft 114 of the hydraulic motor 111. The driving gear 132 drives a second gear 133 mounted on a shaft 134; the second gear 133 is larger than driving gear 132. The shaft 134 is mounted in journal boxes 136 and 137 formed in the walls 138 surrounding the gear reduction assembly 129. A third gear 139 having a smaller radius than second gear 131 is also mounted on the shaft 134 and drives a fourth and much larger gear 141. The fourth gear 141 is rotatable with a second shaft 142.

The second shaft 142 (FIG. 7), at one end 143, is drivingly connected to the differential 37 of the power module 12 and drives the ground engaging means 31. The other end 144 of the second shaft 142 is fitted with a yoke 146 of a universal joint 148 (FIG. 3). A drive shaft 149 is connected to the universal joint 148 to drive the ground engaging means 71 of the work module 13. If four wheel drive is not desired, the end 144 of the second shaft 142 can be utilized as a power take-off.

As can be seen in FIG. 7, the hydraulic motor 111 is attached to the wall 138 of the gear reduction assembly 129. The shaft 114 of the hydraulic motor 111 extends through the gear reduction assembly 129, is carried in journal box 151, and is fitted with a disc 152. A disc brake 153 is provided and fits around disc 152. The disc brake 153 is of standard construction and is linked suitably to a lever (not shown) whereby the disc brakes 153 can be applied from the operator's chair 21.

Although a preferred embodiment has been described hereinbefore, it is to be remembered that various modifications may be made without departing from the invention.

I claim:
1. An articulated vehicle comprising:
a power module having an engine mounted thereon, said power module being carried by ground engaging means;
a work module having work means mounted thereon, said work module being carried by ground engaging means;
connecting means for connecting said power module and said work module, said connecting means allowing said work module to move, relative to said power module, about both a vertical axis and a horizontal axis;
hydraulic pump means mounted on said power module; said hydraulic pump means having a variable displacement and being operatively and drivably connected to said engine;
control means operatively connected to said hydraulic pump means for varying the displacement of said pump;
a hydraulic motor mounted on said power module having a rotatable shaft driven by said hydraulic motor extending therefrom;
inlet conduits and outlet conduits fluidly connecting said hydraulic pump means and said hydraulic motor in a closed loop hydraulic circuit;
at least one relief valve fluidly connected between said hydraulic fluid inlet conduits and said hydraulic fluid outlet conduits;
replenishing means fluidly connected to said closed loop hydraulic circuit for replenishing said closed loop hydraulic circuit with hydraulic fluid;
transmitting means operatively and drivingly connecting said shaft of said hydraulic motor to said ground engaging means of said power module;
a pump unit mounted on said power module and operatively and drivably connected to said engine;
first cylinder means interconnected between said work module and said connecting means, and fluidly connected to said pump unit by fluid lines;
valve means mounted on said power module and interposed in said fluid lines for controlling the flow of fluid to said first cylinder means;
steering means mounted on said power module and operatively connected to said valve means for controlling the flow of fluid therethrough, thus steering said work module;
second cylinder means mounted on said work module and operatively connected to said work means, said second cylinder means fluidly connected to said pump unit by fluid conduits; and second valve means mounted on said power module and interposed in said fluid conduits for controlling the flow of fluid to said second cylinder means for control thereof.

2. The articulated vehicle of claim 1 wherein said transmitting means comprises:
   gear reduction means operatively and drivably connected to said shaft of said hydraulic motor;
   differential means operatively and drivably connected to said ground engaging means of said power module;
   drive means drivably connecting said gear reduction means and said differential means.

3. The articulated vehicle of claim 2 wherein said replenishing means comprises:
   a reservoir for hydraulic fluid mounted on said power module;
   an auxiliary pump mounted on said power module and operatively and drivably connected to said engine;
   replenishing conduits fluidly connecting said reservoir and said auxiliary pump and said auxiliary pump and said closed loop hydraulic circuit.

4. The articulated vehicle of claim 3 wherein said hydraulic pump means is a variable displacement piston pump.

5. The articulated vehicle of claim 4 wherein said hydraulic motor is a positive displacement hydraulic motor.

6. The articulated vehicle of claim 5 wherein said ground engaging means of said power module comprises:
   a left axle and a right axle operatively and drivingly connected to said differential;
   a left wheel connected to said left axle;
   a right wheel connected to said right axle.

7. The articulated vehicle of claim 1 wherein said connecting means comprises a first pair of ears rigidly affixed to said work module and extending rearwardly thereof, said first pair of ears being normally horizontally disposed and vertically spaced apart and having vertically aligned holes formed therethrough; a frame element affixed to said power module and extending forwardly therefrom, said frame element having one end of a normally horizontally disposed sleeve attached thereto, wherein said sleeve extends inwardly thereof, said sleeve and the outermost portion of said frame element having a channel formed therethrough; a lateral strut juxtaposed of the other end of said sleeve and rigidly affixed to said frame element, said lateral strut having a hole formed therein in alignment with said channel; an upstanding member juxtaposed of the outermost portion of said frame element, said upstanding member having a hole formed therethrough in alignment with said channel; a second pair of ears rigidly affixed to said upstanding member and extending outwardly therefrom, said second pair of ears being normally horizontally disposed, vertically spaced apart and mateable with said first pair of ears, said second pair of ears having holes formed therethrough which are vertically aligned with each other and vertically alignable with said holes in said first pair of ears; a second sleeve attached at its ends between said second pair of ears, said second sleeve having a channel formed therethrough with said second sleeve channel aligned with said holes in said second pair of ears; a bolt rigidly attached at one end to the outer periphery of said second sleeve with the other end thereof extending through and rigidly fixed in said hole in said upstanding member, said bolt adapted to extend through said sleeve channel and said lateral strut hole; holding means adapted to be releasably secured to said bolt other end for securing said bolt to said lateral strut; and a trunnion adapted to be disposed in said holes of said first and second pair of ears for securing said ears in a mated condition and rotatably affixing said first pair of ears to said second pair of ears; said first cylinder connected on one end thereof to said upstanding member and on the other end thereof to said work module wherein removal of said holding means from said bolt other end releases said work module from said power module.

References Cited

UNITED STATES PATENTS

| 3,053,043 | 9/1962 | Knowler | 180—66 X |
| 3,342,282 | 9/1967 | Forpahl | 180—51 |
| 3,357,513 | 12/1967 | Sundberg | 180—66 X |

FOREIGN PATENTS

| 719,525 | 10/1965 | Canada. |
| 807,550 | 1/1959 | Great Britain. |
| 1,252,362 | 12/1960 | France. |

A. HARRY LEVY, Primary Examiner

U.S. Cl. X.R.

180—53, 66, 79.2; 214—140